United States Patent Office 3,238,246
Patented Mar. 1, 1966

3,238,246
PROCESS FOR THE PREPARATION OF METHYL HEXADIENOATE
Gian Paolo Chiusoli, Novara, and Sergio Merzoni, Milan, Italy, assignors to Montecatini Società Generale per l'Industria Mineraria e Chimica, Milan, Italy
No Drawing. Filed June 10, 1963, Ser. No. 286,863
Claims priority, application Italy, June 11, 1962, 11,675/62
5 Claims. (Cl. 260—486)

The present invention relates to a new catalytic process for the preparation of methyl hexadienoate.

Several processes for the preparation of 2,5-methylhexadienoate are known. In particular, a process employing as starting product the allyl chloride, according to the equation:

(1)
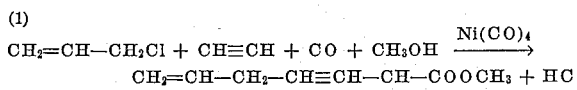
$$CH_2=CH-CH_2Cl + CH\equiv CH + CO + CH_3OH \xrightarrow{Ni(CO)_4}$$
$$CH_2=CH-CH_2-CH=CH-CH-COOCH_3 + HCl$$

is known from U.S. patent application 765,739 filed October 7, 1958, now Patent No. 3,146,354. Another process for the preparation of the same product from methylallyl ether according to the equation:

(2)
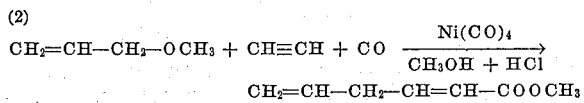
$$CH_2=CH-CH_2-OCH_3 + CH\equiv CH + CO \xrightarrow[CH_3OH + HCl]{Ni(CO)_4}$$
$$CH_2=CH-CH_2-CH=CH-COOCH_3$$

has been described in U.S. patent application 200,328. Both of these processes employ $Ni(CO)_4$ as a catalyst. Actually nickel carbonyl, though acting catalytically in the main process, is always consumed in a remarkable amount as a result of secondary reactions which convert it into $NiCl_2$. The latter is an inconvenience of the aforementioned processes.

We have now found a new process for the preparation of methyl hexadienoate, based upon a reaction analogous to (2) between an allylic compound, acetylene and carbon monoxide, but carried out in the presence of a new catalyst class and under new reaction conditions, thus avoiding the use of nickel carbonyl and hydrochloric acid. The allylic compound may be allyl alcohol, allyl-methyl-ether and allyl acetate.

The reaction is represented by the following equation:

(3) $CH_2=CH-CH_2Y+CH\equiv CH+CO+CH_3OH \rightarrow$
$CH_2=CH-CH_2CH=CHCOOCH_3+HY$ where Y is $OH$, $OCH_3$, $OCOCH_3$. When Y is the acetoxy group, acetic acid is formed which is esterified by the methanol.

The newly used catalyst class includes: nickel bromide and its complexes with organic complexing agents such as phosphines (e.g. triphenylphosphine), ammonium salts (e.g., tetraethyl-ammonium bromide), phosphonium salts (e.g., butyl-triphenyl-phosphonium salts), amides (e.g., N-methyl pyrrolidone), bifunctional ligands (e.g., acetylacetone); nickel alkyl- or aryl-sulfonates (e.g., nickel benzene-sulfonate), etc., and in general all catalysts which are known to be able to catalyze the synthesis of acrylic esters from acetylene and carbon monoxide according to Reppe.

The suitable reaction conditions include temperatures between 150 and 220° C. and pressures between 10 and 200 atm.; a carbon monoxide : acetylene molar ratio from 1 to 10; an alcohol : allylic compound molar ratio from 1 to 10; a weight percentage of catalyst, expressed as nickel, of 0.01 to 2% referred to the mixture alcohol-allylic compound.

The synthesis is in practice carried out by admixing the catalyst with the methyl alcohol and with the allylic compound (alcohol, ether or ester), saturating the mixture with acetylene and carbon monoxide at the desired pressure and heating to 150–220° C. The autoclave is cooled, the pressure is discharged and the mixture is distilled. The recovered allylic compound may be present, after the reaction as alcohol, ether or ester; the allyl alcohol is partly converted to allyl-methyl-ether; the allyl acetate is partly converted to allyl-methyl-ether and allyl alcohol. These products can be recycled to obtain their progressive conversion.

The formed methyl hexadienoate is separated by conventional methods, generally by distillation. In the obtained hexadienoate, the double bonds are in positions 2,5, 3,5 and 2,4 with the 2,5-position prevailing.

The methyl hexadienoate is a useful intermediate to produce drying oils, paints and varnishes as described in U.S. Patents 2,382,297 (1945) and 2,420,694 (1947). They may also be converted by alkaline isomerization, according to La Chimica e l'Industria, 43 (1961), pp. 225–9, in the 2,4-isomer, which is a useful intermediate for the preparation of resins and synthetic fibers.

Another application of methyl hexadienoate, obtained according to the present invention, is in the field of plasticizers such as capronates produced through hydrogenation and following transesterification with the proper alcohols.

Methyl-acrylate is also obtained in remarkable amount if the synthesis is carried out with a CO : $C_2H_2$ ratio near to 1. This is also a useful product for the preparation of plastics, as is well known in the art. If, however, only the dienoic ester is desired, it may be obtained without methyl-acrylate by increasing the carbon monoxide partial pressure always within the above stated range. However in order to avoid a strong decrease in conversion and formation of by-products, it is useful not to reach the upper limit of the ratios CO : $C_2H_2$ even though the methyl-acrylate is not completely eliminated but merely reduced to a very little amount.

The following examples are given to illustrate the present invention, without however restricting its scope.

Example 1

80 g. methyl alcohol, 80 g. methylallyl ether, 4 g. trihydrate nickel bromide and 6 g. acetylacetone are introduced into an oscillating stainless steel autoclave, having a capacity of 930 cc. A nitrogen and carbon monoxide washing is performed and acetylene is then introduced, while stirring the solution, to a pressure of 6 atm. Carbon monoxide is then added, up to a total pressure of 20 atm. At this time, heating is started and the temperature is increased to 175° C. The pressure rises up to about 58 atm. and then decreases slowly down to 40 atm. in 5 hours time. At this moment heating is stopped, while stirring is continued for one additional hour. The product is cooled and the gas discharged. The liquid gives, by distillation at atmospheric pressure, the unreacted methyl alcohol and methylallyl ether besides 10 g. of methyl-acrylate and a small amount of hexadiene, methyl propionate, acetylacetone and 2,5-methyl hexadienoate.

8.2 g. of 2,5-methyl hexadienoate and small amounts of 3,5- and 2,4-isomers are distilled under vacuum at a pressure of 28 mm. Hg and at a temperature of 62–63° C. 18.4 g. of useful products are obtained altogether. Tail fraction distills at 100–140°/28 mm. Hg and consists of 5.2 g.; the distillation residue is 2 g.

Example 2

A glass vessel, with a central hole for the inlet and the exit of gases, is placed in an oscillating autoclave, having a capacity of 930 cc. A mixture of 29.5 g. of allyl alcohol, 70 cc. of methyl alcohol and 3 g. of nickel benzene-sulfonate is introduced into the glass container.

The mixture is flushed with carbon monoxide and saturated with acetylene at about 8 atm. and 15° C.; 38 atm. of carbon monoxide are then added and the temperature is increased up to 170° C. The pressure rises up to about 88 atm. and then decreases slowly. After 4 hours of reaction at 170° C., the autoclave is cooled, the gas is discharged through a trap at −80° C. thus condensing the light products. The mixture is then distilled, first at atmospheric pressure and then under vacuum at a pressure of 25 mm. Hg, up to 80° C. The light products are recovered, which include besides methanol (with a little dimethyl ether), about 22 g. of unreacted allyl alcohol, together with methylallyl ether and diallyl ether. These may be recycled. The reaction product consists of the three isomeric methyl hexadienoates 2,5, 3,5 and 2,4 in the ratio 10:3:0.45; the total quantity is equal to 8.4 g. The distillation residue contains 1.15 g. of organic substances besides the nickel benzene-sulfonate.

*Example 3*

A mixture of 20 g. allyl acetate, 3 g. nickel benzene-sulfonate and 80 cc. methyl alcohol is introduced into the autoclave of Example 2. The mixture is saturated with about 8 atm. of acetylene, then 50 atm. of CO are added. The mixture is heated to 180° C. and maintained at this temperature for 2.5 hours; the pressure rises to 105 atm. and then decreases. The reaction product contains 0.82 g. of 2,5-methyl hexadienoate, 0.37 g. of 3,5-methyl hexadienoate and a minimum amount of 2,4-hexadienoate; methyl-acrylate is equal to 0.09 g. The distillation residue is 0.6 g. The recovered allylic compounds (allyl acetate, methyl-allyl-ether, allyl alcohol) are recycled.

*Example 4*

The reacting mixture contains 20 g. allyl acetate, 1.6 g. $NiBr_2 \cdot 3H_2O$, 3 g. triphenyl-phosphine and 80 cc. methyl alcohol. There are added 8 atm. of $C_2H_5$ and then 90 atm. of CO. The mixture is maintained at 180–190° C. for 1 hour. The reaction product contains 1.06 g. of 2,5-methyl hexadienoate, 0.3 g. of the 3,5-isomer and a minimum amount of the 2,4-isomer. Methyl-acrylate is 0.19 g. The distillation residue is 2.35 g.

*Example 5*

A mixture of 40 g. methyl-allyl-ether, 70 cc. methyl alcohol and 3 g. nickel benzene-sulfonate is saturated with acetylene at 7 atm. and then pressurized with 28 atm. of CO. The reaction is carried out at 185° C. for 4 hours. There are obtained 0.6 g. of 2,5-methyl hexadienoate, 0.3 g. of 3,5-hexadienoate and 0.15 g. of 2,4-hexadienoate.

We claim:

1. Process for the preparation of a mixture of the 2,5, 3,5 and 2,4 isomers of methyl hexadienoate from allylic compounds, methanol, acetylene and carbon monoxide, which comprises reacting allylic compounds of the formula $CH_2=CHCH_2Y$, wherein Y is selected from the group consisting of OH, $OCH_3$ and $OCOCH_3$, in methanol solution, with carbon monoxide and acetylene in molar ratio from 1:1 to 10:1, at pressures from 10 to 200 atm. and temperatures from 150 to 220° C., in the presence of a nickel catalyst selected from the group consisting of nickel bromide, nickel bromide complexed with triphenylphosphine, nickel bromide complexed with tetraethyl-ammonium bromide, nickel bromide complexed with butyltriphenyl phosphonium salts, nickel bromide complexed with N-methylpyrrolidone, nickel bromide complexed with acetylacetone; and nickel aryl-sulfonates.

2. Process according to claim 1, wherein the catalyst is employed in the proportion of 0.01 to 2% by weight of nickel in respect to the weight of the methanol-allylic compounds mixture.

3. Process according to claim 1, wherein the methanol is used in the proportion of 1 to 10 moles per mole of allylic compound.

4. Process for the preparation of a mixture of the 2,5, 3,5 and 2,4 isomers of methyl hexadienoate from allylic compounds, methanol, acetylene and carbon monoxide, which comprises reacting allylic compounds of the formula $CH_2=CHCH_2Y$, wherein Y is selected from the group consisting of OH, $OCH_3$ and $OCOCH_3$, in methanol solution, with carbon monoxide and acetylene in molar ratio from 1:1 to 10:1 at pressures from 10 to 200 atm. and temperatures from 150 to 220° C., in the presence of a nickel bromide-acetylacetone complex.

5. Process for the preparation of a mixture of the 2,5, 3,5 and 2,4 isomers of methyl hexadienoate from allylic compounds, methanol, acetylene and carbon monoxide, which comprises reacting allylic compounds of the formula $CH_2=CHCH_2Y$, wherein Y is selected from the group consisting of OH, $OCH_3$ and $OCOCH_3$, in methanol solution, with carbon monoxide and acetylene in molar ratio from 1:1 to 10:1, at pressures from 10 to 200 atm. and temperatures from 150 to 220° C., in the presence of a nickel bromide-triphenylphosphine complex.

References Cited by the Examiner

UNITED STATES PATENTS

| | | | |
|---|---|---|---|
| 2,967,884 | 1/1961 | Dunn | 260—486 |
| 3,025,319 | 3/1962 | Anderson | 260—486 |
| 3,060,227 | 10/1962 | Stadler | 260—486 |

References Cited by the Applicant

G. P. Chiusoli, S. Merzoni, La Chimica e l'Industria 43 (1961), pp. 255–259, "Studi sui composti carbonilici insaturi" (unsaturated carboxylic compounds).

G.P. Chiusoli, S. Merzoni, Z.f. Naturforschung, 17B (1962), 850, "Zur Carbonylierung von Allyl-chlorids" (carboxylation of allyl-chlorides).

E. O. Fischer, G. Bürger Z.f. Naturforschung 17B (1962) 484–5 "Zur Carbonylierung von Bis-π-Allyl-nickel-bromid und Allyl-halogeniden" (carboxylation of bis-π-allyl-nickel-bromide and allyl-halides).

R. F. Heck, J. Am. Chem. Soc., 85 (1963), 2013.

LORRAINE A. WEINBERGER, *Primary Examiner.*

LEON ZITVER, *Examiner.*